United States Patent [19]

Nausedas

[11] Patent Number: 4,991,260
[45] Date of Patent: Feb. 12, 1991

[54] STUFFING METHOD AND APPARATUS

[75] Inventor: Joseph A. Nausedas, Oak Forest, Ill.

[73] Assignee: Viskase Corporation, Chicago, Ill.

[21] Appl. No.: 442,469

[22] Filed: Dec. 1, 1989

Related U.S. Application Data

[63] Continuation of Ser. No. 297,364, Jan. 17, 1989, abandoned.

[51] Int. Cl.$^5$ .................... A22C 21/02; A22C 11/02
[52] U.S. Cl. ......................................... 452/35; 452/45
[58] Field of Search ................. 17/35, 1 F, 33, 34, 17/41, 42, 36–39, 49

[56] References Cited

U.S. PATENT DOCUMENTS

| | | |
|---|---|---|
| 557,032 | 3/1896 | Seideman . |
| 1,043,241 | 11/1912 | Louden, Sr. . |
| 2,638,624 | 5/1953 | Wade . |
| 3,115,668 | 12/1963 | Townsend . |
| 3,404,430 | 10/1968 | Kielsmeier et al. . |
| 3,545,502 | 12/1970 | Nunlist . |
| 3,553,769 | 1/1971 | Myles et al. . |
| 3,659,317 | 5/1972 | Kupcikevicius ................ 17/35 |
| 3,670,362 | 6/1972 | Hughes . |
| 3,703,064 | 11/1972 | Lugiewicz . |
| 3,952,370 | 4/1976 | Greider . |
| 3,964,236 | 6/1976 | Smith . |
| 4,023,238 | 5/1977 | Phares . |
| 4,142,273 | 3/1979 | Gay . |
| 4,306,334 | 12/1981 | Niedecker . |
| 4,307,489 | 12/1981 | Niedecker . |
| 4,321,728 | 3/1982 | Marz . |
| 4,358,873 | 11/1982 | Kollross . |
| 4,417,368 | 11/1983 | Washburn ........................ 17/49 |
| 4,430,772 | 2/1984 | Michel et al. . |
| 4,437,209 | 3/1984 | Duroyon . |
| 4,484,374 | 11/1984 | Herschberger ................. 17/37 |
| 4,538,326 | 9/1985 | Kollross . |
| 4,549,330 | 10/1985 | Ziolko . |
| 4,551,884 | 11/1985 | Kupcikevicius et al. . |
| 4,625,362 | 12/1986 | Kollross et al. ................ 17/33 |
| 4,649,602 | 3/1987 | Kupcikevicius . |
| 4,675,945 | 6/1987 | Evans et al. . |

FOREIGN PATENT DOCUMENTS 2402617 9/1984 Fed. Rep. of Germany .

OTHER PUBLICATIONS

Sequence of Operation and Sketch–5 pages–dated 4/17/86.

*Primary Examiner*—Willis Little
*Attorney, Agent, or Firm*—Roger Aceto

[57] ABSTRACT

A stuffing method and apparatus utilizing a trio of stuffing horns mounted on a turret. Two of the horns are in stuffing positions and the production of stuffed products alternates between these two horns wherein stuffed casing from one horn is closed while casing is being stuffed at the other. The third horn is available for receiving a supply of casing and is moved into a stuffing position by indexing the turret.

20 Claims, 3 Drawing Sheets

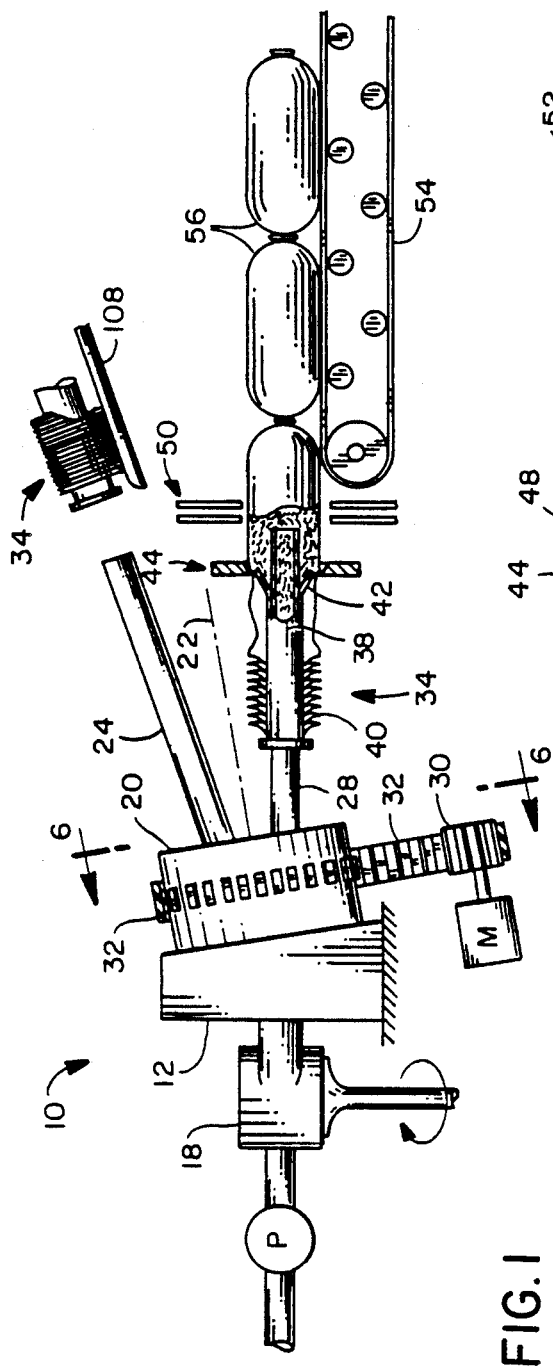
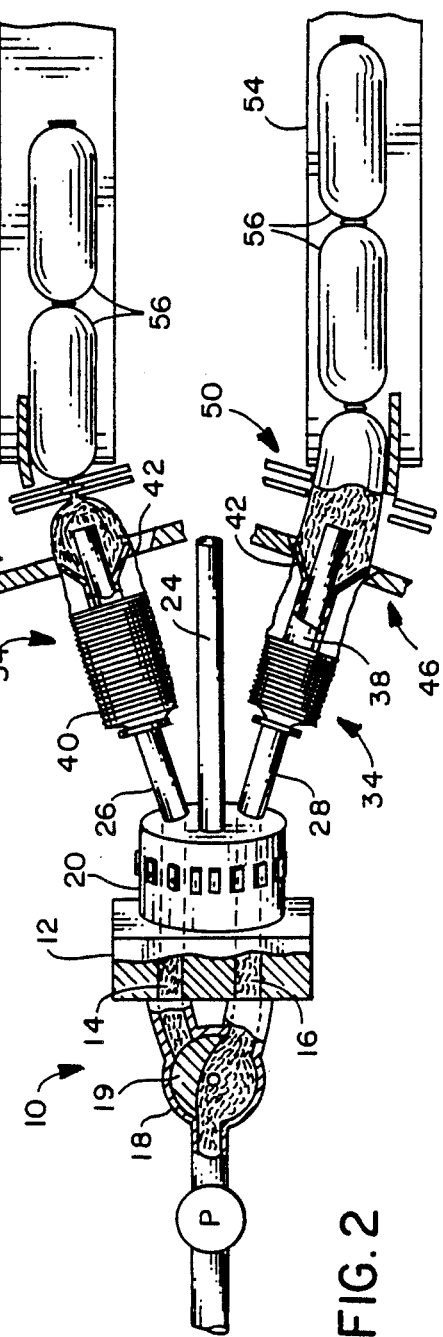
FIG. 1
FIG. 2

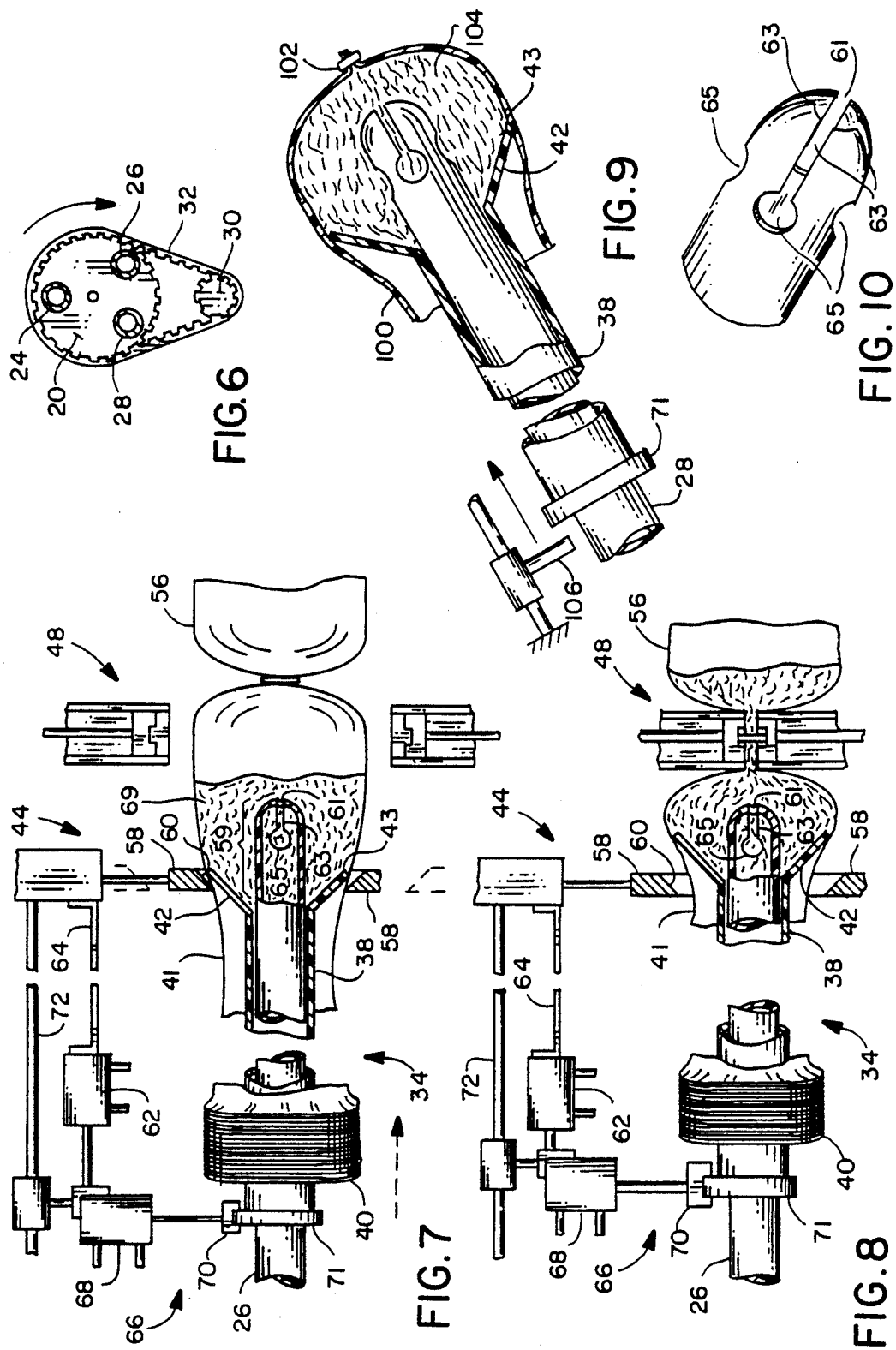

STUFFING METHOD AND APPARATUS

This application is a continuation of prior U.S. application Ser. No. 07/297,364, filed Jan. 17, 1989, now abandoned.

TECHNICAL FIELD

The present invention relates to a stuffing method and apparatus and more particularly to the use of a multihorn stuffing machine for the production of sausages and particularly chub size sausages.

BACKGROUND OF THE INVENTION

The term "chub" identifies a type of sausage having a stubby appearance. For example, a chub typically is from about 10 to 15 centimeters long and about 4 to 6 centimeters in diameter.

A typical stuffing machine for producing chub size products operates at the rate of about 40 to 120 chubs per minute depending in part on the size of the chub. These machines operate automatically in that they utilize casing in the form of a shirred stick so that a plurality of chubs can be made using the casing contained in a single stick.

The term "shirred stick" is well known in the stuffing art and describes a hollow casing article composed of a relatively long length of casing shirred and longitudinally compacted to a short length. For example, a shirred stick 50 centimeters long may contain upwards of 50 meters or more of casing. After a shirred stick is located on a stuffing horn the machine can operate automatically until the supply of casing is exhausted.

In a typical stuffing operation a shirred stick is loaded on to a stuffing horn and a pump is started for forcing the food product to be stuffed through the stuffing horn under pressure. The food product which discharges from the horn enters and draws forward casing from the shirred stick to stuff the casing. After a desired length is stuffed, the pump is stopped and a closure is applied, usually a metal clip, to form an end of the chub. The pump is then restarted to stuff another length of casing. Stuffing and closing in this fashion continues until a string of chubs is formed. After forming a string composed of a limited number of say five or six chubs, a cord or plastic loop is attached along with the last clip of the string and the string is severed from the shirred stick. The cord or plastic loop is used to hang the string for processing to cook or smoke the chubs. After processing, the casing is removed and the chubs are individually packaged in a suitable packaging, such as a shrink wrap, for retail sale.

The need to stop and then restart the pump mechanism each time a clip is applied leads to excessive wear on the pump drive. It also prolongs the time it takes to stuff the length of casing contained in a shirred stick.

It is of course, necessary to stop stuffing in order to load a shirred stick onto the stuffing horn so the machine is idle while a new supply of casing is loaded. Stuffing systems have been developed which utilize a plurality of stuffing horns so that while a first horn is being utilized for stuffing, a second horn can be loaded with casing and prepared for movement into a stuffing position as soon as the supply of casing on the first horn is exhausted. While such multihorn systems reduce the idle time of the machine they do not reduce the time it takes to stuff the length of casing contained in a shirred stick. In this respect, the pump of the machine still is cycled on and off to apply clips.

OBJECTS OF THE INVENTION

One object of the invention is to provide a stuffing system in which stuffing continues even while closures are being applied to stuffed casing.

Another object of the invention is to provide a stuffing system in which a pump operates continuously to pump a food product to a pair of stuffing horns and is shut down only when the supply of casing on one of the horns is exhausted.

A further object of the invention is to provide a stuffing system utilizing two horns for stuffing and two clippers for closing the stuffed casing and coordinating the stuffing and clipping operations so that clipping at one horn occurs during stuffing at the other horn.

SUMMARY OF THE INVENTION

The stuffing method and apparatus of the present invention has at least two stuffing positions and there is a stuffing horn in each stuffing position at any given time. Each horn carries a supply of casing in the form of a shirred stick. A pump connected to both horns continuously pumps a food product under pressure to the horns for stuffing the casing.

Between the pump and the two stuffing horns is a valve which operates to direct the flow from the pump to one or the other of the horns. The valve is switched back and forth between the horns in timed intervals. A clipper at each stuffing position operates in conjunction with the valve to clip the casing stuffed at one of the horns during the interval that the valve is directing flow to the other. In this fashion an encased product (hereafter "chub") is produced first at one horn and then at the other. This stuffing, back and forth between the two horns, continues until the casing supply on one or the other horn is exhausted.

The pump operates continually during the entire time of stuffing with only the valve being cycled to alternate the continuous flow from the pump between the two stuffing horns. Since the pump is not stopped to accommodate the action of the clipper, the wear on the pump drive mechanism and the time for stuffing a length of casing equivalent to a length contained in a stick are reduced.

In a preferred embodiment, the stuffing machine of the present invention is provided with three stuffing horns. At any given time, two of the horns are in stuffing positions as described hereinabove while the third horn is in a load or ready position.

At the start of operation, the horn at a first stuffing position and the horn in the load position both carry full sticks of shirred casing, but the horn at the second stuffing position carries only a partial stick of shirred casing. The partial stick at the second position will expire first and when this occurs, there still will be part of a shirred stick left on the stuffing horn in the first stuffing position. At this point, the pump is stopped and the horns are indexed one position. After indexing, the horn without casing will be at the load position; the horn indexed from the first stuffing position to the second will contain a partial stick; and the horn indexed from the load position to the first stuffing position will contain a full stick. After indexing in this fashion, the pump is restarted and stuffing continues until the partial stick at the second stuffing position is about to expire at which time the cycle repeats.

DESCRIPTION OF THE DRAWINGS

FIG. 1 a schematic view showing in side elevation components of the stuffing machine of the present invention;

FIG. 2 is a top view of the apparatus as shown in FIG. 1;

FIG. 6 is a view taken along lines 6—6 of FIG. 1;

FIG. 7 is an enlarged scale view partly broken away and in section showing a portion of the stuffing apparatus in a stuffing mode;

FIG. 8 is a view similar to FIG. 7 only showing the apparatus in a clipping mode;

FIG. 9 is a view on an enlarged scale showing one stuffing horn of the apparatus at a load position; and FIG. 10 is a perspective view showing the discharge end of a preferred stuffing horn used in the apparatus of the present invention.

DESCRIPTION OF THE EMBODIMENTS

Figure 3:
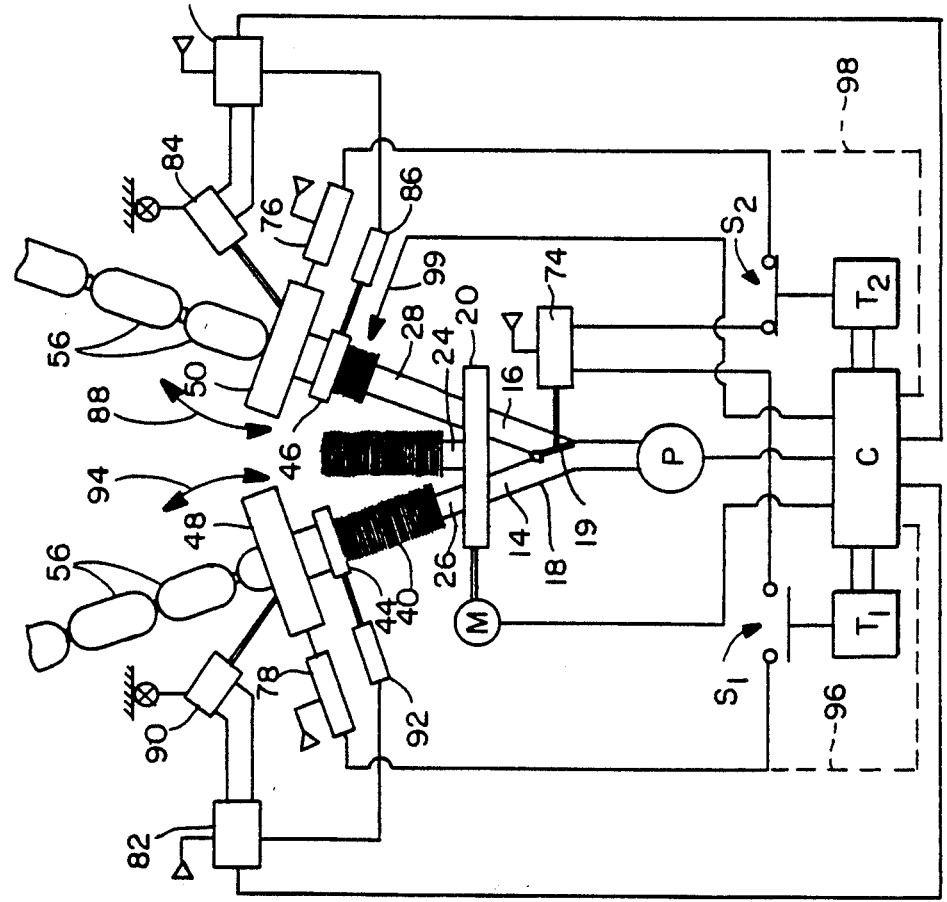
FIG. 3 is a schematic diagram showing control elements of the stuffing machine of the present invention.

Referring to the drawings, FIGS. 1 and 2 show the stuffing machine of the present invention generally indicated at 10. The machine includes a pump P for pumping a food product under pressure from a reservoir (not shown) to a manifold 12. The manifold has two separate passages, portions of which are shown at 14 and 16 respectively (FIG. 2). A valve 18 between the pump and manifold has a gate 19 which serves to cycle a flow of food product to one or the other of the manifold passages 14 and 16 (FIG. 2).

A turret 20 is mounted to the manifold for rotation about an axis 22 which is tilted at about 10° from the horizontal. The turret carries three stuffing horns 24, 26 and 28 spaced at about 120° intervals around the turret. A drive means, as represented by a drive gear 30, timing belt 32 and motor M, is provided for indexing the turret about axis 22.

At any given time, two of the three stuffing horns are in communication with the manifold passages 14 and 16 and these horns are considered to be in a stuffing position. As best shown in FIG. 2, there is a left stuffing position as represented by stuffing horn 26 and a right stuffing position as represented by stuffing horn 28. The longitudinal axis of each stuffing horn in the stuffing positions is generally horizontal. The third horn (not in communication with either passage) is considered to be in a load position. In the load position (as represented by horn 24 in FIGS. 1 and 2) the stuffing horn is tilted upwardly from the horizontal about 22°. This upwardly tilted position facilitates the loading of casing articles onto the stuffing horn as further set out hereinbelow.

The horns 26, 28 in the left and right stuffing positions each carry a shirred casing article generally indicated at 34. The casing articles per se form no part of the present invention and are more particularly described in U.S. Pat. No. 4,649,602 the disclosure of which is incorporated herein by reference. It is sufficient for purposes of the present invention merely to say that each casing article includes an elongated tubular core 38 which carries a shirred length of casing 40 (hereafter referred to as a "shirred stick"). Preferably the shirred stick grips tightly about the core so that the friction therebetween prevents the shirred stick from sliding along the core. Each tubular core 38 also has a sizing means 42 at one end. The sizing means is generally conical in shape and has a fixed circumference which is larger than the unstretched circumference of the casing contained in the shirred stick so that the casing is stretched circumferentially as it draws forward from the shirred stick and passes over the sizing means during stuffing.

Associated with each left and right stuffing position is a casing brake generally indicated at 44, 46 respectively. The casing brakes of the stuffing machine and the sizing means of the casing articles cooperate to control the drag on the casing as the casing deshirrs and draws forward from the shirred stick during stuffing. As will be further described hereinbelow, the amount of the drag exerted on the casing determines in part its stuffed diameter.

Also associated with each left and right stuffing position is a clipper carriage, a portion of which is generally indicated at 48 and 50 respectively. Clipper carriages are well known in the art and will be described herein only to an extent sufficient for an understanding of the present invention. Briefly, a clipper carriage is disposed forward of a stuffing horn to form the stuffed casing into chubs. This is done by gathering the stuffed casing towards the longitudinal axis of the stuffed casing and then attaching a clip to the gathered casing. The clipper can apply one or two clips as desired. For example, a single clip is used to form both the trailing end of one chub and the leading end of the following chub. Two adjacent clips are used in order to permit separation of the stuffed chubs and for this purpose the clipper also has a knife (not shown) to sever the casing between the two adjacent clips. The clipper further may include a looper mechanism (not shown) which attaches a loop along with one of the clips so a string of chubs can be hung for processing. The operation of clipper carriages in cooperation with stuffing machines is shown in U.S. Pat. Nos. 4,438,545; 4,675,945; 4,437,209 and 4,773,128 among others.

As further shown in FIGS. 1 and 2, there is a conveyor 52, 54 at each stuffing position for receiving the chubs 56 formed by the clipper carriages to move them away from the stuffing horns.

FIGS. 7 and 8 illustrate one of the stuffing positions in greater detail. Since both the left and right stuffing positions are identical, only the left position will be described including the stuffing horn 26, casing article 34, casing brake 44 and clipper carriage 48.

As mentioned hereinabove, the casing article preferred for use with the apparatus of the present invention is a cored casing article of the type disclosed in U.S. Pat. No. 4,649,602. Such an article includes a disposable plastic core 38 which has an outwardly flared end serving as a sizing means 42. Disposed on the core is a shirred stick 40. A portion of casing which deshirrs from the stick is shown at 41.

During stuffing, casing 41 draws forward from the shirred stick and over the sizing means 42. The circumference of the outwardly flared end 43 of the sizing means preferably is greater than the unstretched circumference of the casing 41 so that the casing is stretched circumferentially as it passes over the sizing means. The stretching of the casing by the sizing means not only expands and prepares the casing for stuffing, but also provides a seal between the casing and the flared end 43 to prevent food product from flowing back around the sizing means.

Casing brake 44 includes a pair of split jaws 58 which are movable between an open position and a closed position. When the jaws are in the open position (shown in dotted line in FIG. 7), the casing brake 44 is clear of the sizing means 42 and stuffing horn 26 for purposes set out hereinbelow. When the jaws are in the closed position (shown in solid line) the casing brake 44 can cooperate with the sizing means to control the stuffed diameter of the casing. In this respect, the jaws 58, in the closed position, define an outwardly flared inner surface 60 (FIG. 7) which substantially matches the flare of the sizing means 42. By adjusting the relative longitudinal position between the sizing means and the flared surface 60, the drag or tension on the casing can be adjusted to increase or decrease the stuffed diameter of the casing. For example, in the position as shown in FIG. 7 the distance between the flared surface 60 and the sizing means 42 is at a minimum so the drag on the casing is high. The result is that the diameter of the stuffed casing is at a maximum. Increasing the relative longitudinal spacing between the casing brake and sizing means reduces the drag on the casing with the result that the stuffed diameter decreases.

Adjusting the spacing between sizing means 42 and the casing brake 44 is accomplished in the present invention by moving the casing article 34 relative to the brake. As shown in FIG. 7, the apparatus for accomplishing this relative motion includes an air cylinder 62 which is fixed to the casing brake 44 by a bracket 64. The air cylinder 62 is connected to a gripper mechanism generally indicated at 66 which grips the end of the tubular core. The gripper mechanism includes a second air cylinder 68 which operates a latch 70 that is adapted to engage a flange 71 on the aft end of the core 38. When the latch 70 and flange 71 are engaged, increasing the pressure in air cylinder 62 so as to increase the force pushing the casing article in an aft direction (to the left as viewed in the figures), will increase the drag on the casing. Conversely, decreasing the pressure in the air cylinder 62 decreases the drag on the casing. A guide 72 is provided for insuring that the forward and aft motion of the gripper means 66 is rectilinear.

It should be appreciated that movement of the casing article in a forward direction may be utilized to facilitate the gathering and clipping of the casing by the clipper carriage 48. For example, as shown in FIG. 8 the casing article 34 has been moved to a position spaced forward from the casing brake 44 to reduce the drag on the casing to a minimum. In this position, closing the clipper carriage 48 about the stuffed casing, as shown, will allow casing 41 to draw forward from the shirred stick 40 to provide the casing needed for gathering together to form the closed ends of the chubs.

As shown in FIGS. 7 and 8 (and as best seen in FIG. 10) a preferred stuffing horn has a restricted outlet 61 which is smaller in diameter than the inside diameter of the stuffing horn. Four slots 63 spaced about the horn each extend longitudinally from the restricted outlet 61 and terminate in an opening 65. Thus, there are four openings 65 spaced circumferentially around the discharge end of the stuffing horn. The openings 65 may be circular as shown or other shape. Also, slots 63 are not essential to the stuffing method of the invention but prevent clogging of openings 65. The configuration as shown allows food product to exit from the stuffing horn in both longitudinal and radial streams so that a swirling and mixing action is created as the food product enters the casing. The swirling action tends to prevent fatty particles from migrating to the inner surface of the casing. This, in turn, avoids creating an undesirable smear of fat just under the casing.

Extending or "burying" the discharge end of a horn within the stuffed casing so that some length of the stuffing horn is surrounded by the food product also helps to avoid smear.

In this respect, FIG. 7 shows that the end of the stuffing horn as defined by its outlet 61 is spaced forward from the conical sizing means 42. The distance between outlet 61 and the sizing means defines a discharge end portion 59 of the horn which is "buried" within the stuffed casing.

During stuffing as shown in FIG. 7, the casing is expanded by drawing it forward over the sizing means. The food product which discharges in streams from the restricted outlet 61 and circumferential openings 65 swirls into and fills the volume 69 of the expanded casing extending from the discharge outlet 61 back to the sizing means 42. Since the casing brake jaws 58 close against the sizing means 42, the casing is maintained in an expanded condition by the food product in volume 69 as it draws forward of the sizing means and beyond the outlet 61. The expanded casing including volume 69 (defined by the diameter of the sizing means and the length of the discharge end portion 59) remains filled as the casing is drawn forward by the pressure of the food product discharging into the casing.

As mentioned above, it is believed that the swirling and mixing action created as the food product discharges into this volume prevents smear. In this respect, it has been found that locating the sizing means too close to the openings 65 tends to increase the likelihood of smear. The likelihood of smear also is increased by using a horn with no circumferential openings (so there is only a longitudinal discharge and no lateral or transverse discharge from the stuffing horn) even if a discharge end portion 59 of the horn is buried in the stuffed casing.

It should be appreciated that when using a horn as shown in FIG. 7, the longitudinal spacing between the generally conical sizing means 42 and the horn outlet 61 for reducing smear may vary depending upon various factors such as the horn diameter, the size and number of openings 65, and the consistency of the food product being stuffed into the casing. It would be well within the ordinary skill of the art to determine the length of the discharge end portion 59 relative to the sizing means 42 which is most effective to minimize smear in any given instance.

This is illustrated by the stuffing of a hard salami product about 52.3 mm in diameter using a horn as shown in FIGS. 7 and 10. The horn has an outside diameter of about 25 mm and an inside diameter of about 20 mm. Restricted outlet 61 measures about 12.7 mm in diameter. Four circumferential openings 65, also about 12.7 mm in diameter are located with centers about 20.5 mm from the end of the horn. Slots 63 extending from each opening 65 to outlet 61 are about 1.6 mm wide. The casing for stuffing the salami mixture is a Viskase Corporation size 1M SHIRMATIC® 403 casing having an unstretched diameter of about 45 mm. The conical sizing means 42 has a cone angle of about 45° and an outside diameter of about 50.8 mm.

Placing the outwardly flared end of sizing means too close to the openings 65 (about 27 mm from the horn outlet 61) at the outset of stuffing results in a product having the objectionable smear of fat just under the casing. Moving the sizing means away from the openings 65 to increase the length of the discharge end portion 59 causes a gradual decrease of this smear until the outwardly flared end of sizing means is about 40-45 mm from the outlet 61. At this point, smear is substantially eliminated. Moving it still farther away does not further enhance the appearance of the product. In contrast, using a horn of the same size but without the restricted outlet 61 and circumferential openings 65 does not eliminate smear even when the sizing means is located a distance from the end of the horn greater than 45 mm.

One aspect of the operation of the present invention is that the pump P runs continuously, even during the time the stuffed casing is being formed into chubs by the clipper carriages 48, 50. The pump can run continuously because valve 18 operates to direct flow to only one or the other of the stuffing positions. With this arrangement, the clipper at one of the stuffing positions can operate while the gate 19 of valve 18 is directing flow to the other stuffing position.

As shown in FIG. 2, clipper carriage 48 at the left stuffing position is operating to gather and close the stuffed casing. At the same time, valve 18 is in position to direct the flow away from the left stuffing position and through manifold passage 16 to stuffing horn 28 at the right stuffing position. When a desired length of casing has been stuffed at the right stuffing position, the gate 19 of valve 18 is turned to shut off flow to manifold passage 16 and to communicate the pump through manifold passage 14 to the stuffing horn 26 at the left stuffing position. While casing is being stuffed at the left stuffing position, the clipper carriage 50 is operated to gather and close the stuffed casing at the right stuffing position.

Thus, without stopping the pump, flow of the food product is switched from the one stuffing position to the other to stuff the casing while the clipper carriages operate to form chubs. In this fashion, the pump P operates continuously while valve 18 cycles to alternate flow to one or the other of the stuffing positions until the length of casing in a shirred stick at one or the other of the stuffing positions is exhausted.

Figure 4:
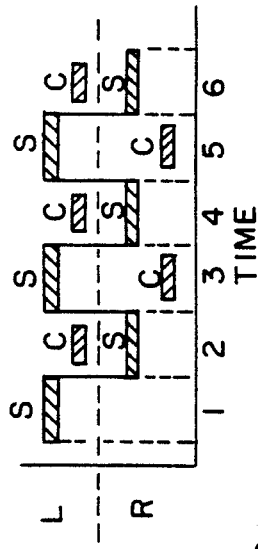
FIG. 4 is a bar chart showing the cycle of operation of the stuffing machine as a function of time.

It should be appreciated that the continuous operation of pump P is feasible only if the time of the stuffing interval is longer than the time it takes for the clipper carriage to operate. This is illustrated in FIG. 4. FIG. 4 illustrates the operation of the left and right stuffing positions (L,R respectively) during each of the time intervals 1-6. As shown in FIG. 4, the time "S" required to stuff out a desired chub length determines the length of each time interval 1-6. As further shown in FIG. 4, time "C" required to gather and close the stuffed casing is shorter than the stuffing interval. Accordingly, the closing of stuffed casing at one of the stuffing positions occurs during the stuffing of casing at the other stuffing position. Should the time to stuff a desired chub length approach or become shorter than the time it takes the clipper carriage to operate, the pump must be slowed to increase the stuffing time or the flow of the food product must be interrupted. It also should be apparent that the pump must be stopped and flow interrupted in order to resupply a stuffing horn with a shirred stick. However, such an interruption is minimized by utilizing three stuffing horns and by operating the apparatus in the sequence shown in FIG. 5.

Figures 5A, 5B:
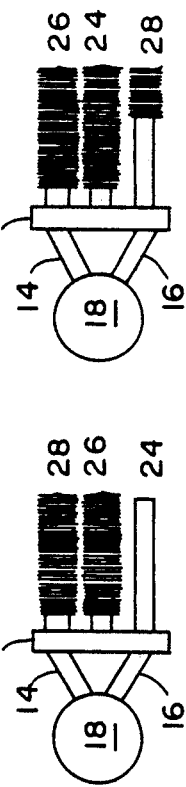
FIG. 5 a–f are schematic plan views of the stuffing horn arrangement of FIG. 1 showing a sequence of operation of the stuffing machine of the present invention.

FIG. 5 is a schematic plan view representation of the three stuffing horns of FIG. 1 wherein the middle horn represents a horn in the load position and the upper and lower horns represent horns in the left and right stuffing positions respectively. For purposes of illustrating the sequence of operation, FIG. 5a shows that initially stuffing horn 28 is in the left stuffing position, stuffing horn 26 in the load position, and stuffing horn 24 is in the right stuffing position. Initially, only horn 26 (load position) and horn 28 (left stuffing position) carry shirred sticks.

At start up, it is customary to stuff a few chubs to insure that the machine is making chubs of the desired size and to make adjustments as necessary to bring the chubs into conformity with tolerances. This start up procedure initially is performed at the left stuffing position with horn 28 so that some length of the casing is utilized from the shirred stick on this horn. Once the left stuffing position is operating properly, the turret 20 is indexed clockwise, as shown in FIG. 6. This moves the horns to the position shown in FIG. 2, wherein horn 28 is at the right stuffing position, horn 26 is at the left stuffing position, and horn 24 is at the load position. The start up and test procedure is repeated at the right stuffing position which further uses some casing from the shirred stick on horn 28.

If a shirred stick is now loaded onto horn 24, the condition shown in FIG. 5b results. As shown in FIG. 5b, horn 26 (left stuffing position) and horn 24 (load position) each contain an unused shirred stick of casing whereas horn 28 (right stuffing position) contains a partly used stick of casing. Thus, the length of the casing in the shirred stick on horn 28 is shorter than the length of casing in the stick on either horn 26 or horn 24.

Figures 5C, 5D:
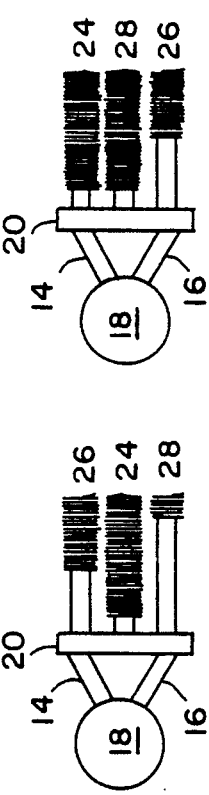

At this point, the stuffing of chubs begins and pump P (FIGS. 1 and 2) operates continuously as described hereinabove until the supply of casing on horn 28 (right stuffing position) is about to run out. This is illustrated in FIG. 5c. FIG. 5c shows that even though the shirred stick on horn 26 (left stuffing position) is only partly exhausted, the shirred stick on horn 28 (right stuffing position) is substantially completely exhausted so stuffing must stop. At this point, the pump stops and the turret 20 indexes one position in the clockwise direction. This locate horn 24 in the left stuffing position, horn 26 in the right stuffing position, and horn 28 in the load position.

Any casing remnant is removed from horn 28 and replaced with a new shirred stick. The result, as shown in FIG. 5d, is that horn 24 (at the left stuffing position) contains an unused shirred stick, horn 26 (at the right stuffing position) contains a partly used stick, and horn 28 (at the load position) contains an unused stick of casing. Pump P starts and runs continuously as described hereinabove until the partial stick on horn 26 (right stuffing position) is about to run out. This is illustrated in FIG. 5e.

Figures 5E, 5F:
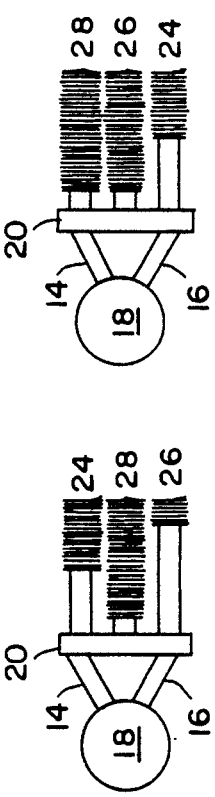

FIG. 5e shows that horn 24 (left stuffing position) contains a partial stick, horn 26 (right stuffing position) has little or no casing remaining and horn 28 (load position) contains an unused stick of casing. At this point, the pump stops and turret 20 again indexes one position clockwise. This moves stuffing horn 28 back into the left stuffing position, moves horn 24 into the right stuffing position, and moves horn 26 to the load position. At the load position, any casing remaining on horn 26 is moved and replaced with a new unused shirred stick (FIG. 5f). The cycle of stuffing through two horns, indexing and resupplying the horn at the load position with casing is then repeated.

FIG. 3 illustrates, in schematic fashion, the system for operating the stuffing machine of the present invention. In describing this system, components of the stuffing machine are identified with the same reference numerals as corresponding components shown in FIGS. 1 and 2.

As shown in FIG. 3 the system for operating the stuffing machine includes a controller C. This controller may comprise any suitable mechanical, or pneumatic device conventionally used for controlling the operation of a stuffing machine. For purposes of the present invention, one suitable controller is an Allan Bradly PLC4 programmable logic controller. A preferred controller comprises a Micro Aide 80-0018C microprocessor card in combination with a Micro Aide 80-0022 input/output card and an optically coupled relay such as an Opto-22.

Controller C controls the operation of a pair of timers $T_1$ and $T_2$. Timer $T_1$ operates an electrical switch $S_1$ which closes when timer $T_1$ starts and opens when a preset time has elapsed. In a similar fashion, timer $T_2$ operates an electrical switch $S_2$ which closes when timer $T_2$ starts and opens when a preset time has elapsed.

Closing switch $S_2$ performs two functions. First, it operates a drive means such as a solenoid controlled air cylinder 74 to move the gate 19 of valve 18 to the position shown in FIG. 3. In this position the foodstuff from pump P is directed down manifold passage 14 and into stuffing horn 26 at the left stuffing position. Closing switch $S_2$ also triggers a solenoid controlled air cylinder 76 which causes clipper carriage 50 at the right stuffing position to gather and close the stuffed casing.

In a similar arrangement, timer $T_1$ operates electrical switch $S_1$. Closing switch $S_1$ causes the solenoid controlled air cylinder 74 to move the gate of valve 18 to a position for directing the flow of the food product through manifold passage 16 and into the right stuffing horn 28. Closing switch $S_1$ also triggers a solenoid controlled air cylinder 78 which causes the clipper carriage 48 at the left stuffing position to gather and close the stuffed casing. Controller C also operates the pump P, motor M and the operation of solenoid valves 80 and 82 as set out further hereinbelow.

Solenoid valve 80 is connected to air cylinders 84 and 86. Air cylinder 84 operates to move the right clipper carriage 50 towards or away from the right stuffing horn in the direction indicated by arrow 88 and air cylinder 86 operates to open and close the right casing brake 46. In similar fashion, solenoid valve 82 is connected to air cylinders 90 and 92. Air cylinder 90 operates to move the left clipper carriage 48 towards and away from right stuffing horn in the direction of arrow 94 and air cylinder 92 operates to open and close the left casing brake 44.

As illustrated by dotted line connections 96 and 98, controller C can circumvent the timers and assume direct control of the clipper carriages. For example, the controller may be programmed to count the number of chubs produced at a stuffing position. When a string comprising a desired number of chubs 56 is produced, it directs the appropriate clipper carriage 48 or 50 to apply a loop along with the last clip in the string and then directs the clipper carriage to sever the string from the shirred stick. The controller C also will assume direct operational control of each clipper carriage at the end of a stuffing cycle for purposes described hereinbelow.

The sequence of operation of the apparatus and method of the present invention will be described with reference to FIG. 3 as beginning at a time in the cycle of operation when there is a full shirred stick 40 on left horn 26 and a partial stick on right horn 28, and when timer $T_2$ is operating and switch $S_2$ is closed. At this point, pump P is operating and valve 18 is in position to direct the flow of food product through manifold passage 14 and into stuffing horn 26 at the left stuffing position. This condition continues for a preset time which allows the stuffing of a given length of casing from shirred stick 40 at the left stuffing position. When the time set on timer $T_2$ expires, switch $S_2$ opens and controller C starts timer $T_1$.

Starting timer $T_1$ closes switch $S_1$. This causes air cylinder 74 to operate valve 18 to switch the flow of food product through manifold passage 16 into stuffing horn 28 at the right stuffing position. Closing switch $S_1$ also triggers air cylinder 78 which causes the left clipper carriage 48 to gather and close the stuffed food casing at the left stuffing position. When the time set on timer $T_1$ expires switch $S_1$ opens and controller C starts timer $T_2$. Starting time $T_2$ closes switch $S_2$. This causes valve 18 to cycle back to the position shown in FIG. 3 so that casing is stuffed at the left stuffing position. Closing switch $S_2$ also triggers air cylinder 76 which causes the right clipper carriage 50 to gather and close the stuffed casing at the right stuffing position.

In this fashion, the gate 19 of valve 18 is cycled back and forth in a timed sequence to direct the flow from the continuously operating pump P to one or the other of the manifold passages 14, 16 for stuffing the casing. And, while casing is being stuffed at one of the stuffing positions, a clipper carriage 48, 50 at the other stuffing position operates to gather and clip the previously stuffed casing thereby alternating the formation of chubs 56, first at one stuffing position and then the other.

As mentioned hereinabove, it usually is preferred to sever the casing after a string of several chubs is formed. Accordingly, controller C includes a counter which counts the number of chubs formed at each stuffing position. When the desired number of chubs has been formed at a stuffing position, the appropriate clipper carriage is directed to apply a loop along with the last clip in the string and then the clipper carriage severs the string from the shirred stick.

The sequence of operation as described hereinabove continues until the supply of casing contained in the partial stick on stuffing horn 28 (right stuffing position) is about to run out. When this condition is sensed by any suitable end-of-casing sensor 99, a sequence of events is initiated for terminating the stuffing cycle.

To initiate the termination of stuffing, controller C disables timer $T_1$ to prevent further stuffing at the right stuffing position. It then directs the clipper carriage 50 to gather, clip and sever the stuffed casing. At this point, the casing at the left stuffing position also can be severed. However, as previously noted, controller C counts the chubs produced at each stuffing position before severing the casing. In the event the termination of stuffing is initiated before a full string of chubs is made at the left stuffing position, the controller overrides timer $T_1$ and continues stuffing at only the left position until the string is completed.

To complete the string at the left stuffing position, the controller operates to lock valve 18 in position to direct flow through manifold passage 14. The controller then starts and stops pump P and operates clipper carriage 48 as necessary to complete the string of chubs. After the additional chubs are stuffed and the string is complete, the clipper carriage 48 is directed to apply a loop along with the last clip and to sever the string from the shirred stick. This completes the stuffing cycle.

When the stuffing cycle is complete, controller C initiates the indexing of turret 20. In order to index the turret 20, clipper carriages 48, 50 and casing brakes 44, 46 must be removed from in front of the stuffing horns 26, 28. To accomplish this, the controller C signals solenoid valves 80, 82 to operate air cylinders 84, 90 respectively. This causes the clipper carriages 48, 50 to swing away from the stuffing horns in the direction indicated by arrows 88, 94. Solenoid valves 80, 82 also operate the air cylinders 86, 92 to open the casing brakes 46, 44 respectively. After the clipper carriages and casing brakes are moved clear of the stuffing horns, motor M is activated to index turret 20 one position. This moves stuffing horn 26 to the right stuffing position, horn 28 to the load position and horn 24 to the left stuffing position. After the turret indexes, the controller signals solenoid valves 80, 82 to return the clipper carriages 48, 50 and the casing brakes 46, 44 to their operative positions as shown in FIG. 3 so the stuffing cycle can begin.

FIG. 9 illustrates stuffing horn 28 after indexing to the load position. All that remains of the shirred casing article is a spent core 38 and a remnant of casing indicated at 100 which extends over sizing means 42 and is closed by a clip 102. A small quantity of food product 104 is disposed within the closed casing and is removed from the stuffing horn along with the core. The removal of the spent core and the loading of a fresh casing article onto horn 28 can be accomplished manually. However, it is preferred that unload and load functions be accomplished automatically.

A suitable automatic unloader/loader device includes an ejector, a portion of which is shown at 106 in FIG. 9. This ejector is moved into engagement against the flange 71 at the aft end of the plastic core 38 for driving the core off the stuffing horn.

After the spent core 38 is removed from the stuffing horn, a new casing article is loaded onto the horn by any suitable means. For example, a conveyor (not shown) can be arranged to deliver individual casing articles to a chute, a portion of which is shown at 108 FIG. 1. The chute 108 is oriented to allow a casing article 34 to slide down the chute and onto the upturned stuffing horn.

While the stuffing method and apparatus of the present invention has been described in connection with the stuffing of chubs, the invention also can be used for producing products of other sizes such as bologna or long length pepperoni for slicing. In its preferred form, the present invention is arranged to utilize a cored casing article, however it should be appreciated that the invention can be modified to utilize uncored casing articles. For example, casing brakes 44, 46 can be modified to press the casing directly against the stuffing horn for controlling the stuffed diameter of the casing. Casing brakes which function in this manner are well known in the art and are shown, for example in U.S. Pat. Nos. 3,748,690 and 3,751,764 among others.

It also is possible to utilize an uncored casing article having an implanted sizing disc as disclosed in U.S. Pat. No. 4,007,761. If such a casing article is used, the apparatus can be modified to incorporate a system for controlling stuffed diameter as disclosed in U.S. Pat. No. 4,437,209.

Thus, it should be appreciated that the present invention accomplishes its intended objects. Utilizing two stuffing horns and a valve to divert flow to one horn or the other allows the food pump to operate continuously for the time it takes to stuff an entire shirred stick (i.e., portions of two sticks equaling a full stick). Moreover, alternating stuffing from one horn to the other shortens the overall stuffing cycle by utilizing the time interval of stuffing at one of the horns to gather and clip at the other.

Utilizing three horns and indexing in a step-wise fashion as shown in FIG. 5, shortens the time for moving shirred casing into a stuffing position. Moreover, the preferred apparatus as described herein which utilizes a cored casing article provides a substantially completely automatic chub stuffing machine wherein the loading of casing articles, stuffing of chubs and removal of spent cores can continue uninterrupted for an indefinite period.

Having thus described the invention in detail, what is claimed as new is:

1. A method of producing encased food products utilizing a stuffing machine having at least three stuffing horns comprising the steps of:
    (a) positioning first and second stuffing horns of said machine in a stuffing position with a supply of casing on each wherein the first horn has a shorter casing supply than the second horn;
    (b) cycling the flow of a food product to each horn in said stuffing position, first through one of said horns and then through the other to alternately draw forward and stuff casing from the supplies on said first and second horns;
    (c) closing the stuffed casing from one of said supplies concurrent with the stuffing of casing from another of said supplies so that the production of encased products alternates between said first and second horns in said stuffing position;
    (d) moving the first horn out of the stuffing position when its supply of casing is substantially exhausted;
    (e) moving the second horn and its remaining supply of casing from its stuffing position and into the stuffing position vacated by the first horn; and
    (f) moving a third horn having a supply of casing into the stuffing position vacated by the second horn.

2. A method as in claim 1, wherein said closing of stuffed casing from one of said supplies occurs within the time for stuffing casing from another of said supplies.

3. A stuffing method comprising:
    (a) locating a first shirred supply of casing at a first stuffing position;
    (b) repeating a sequence of stuffing, gathering and closing a portion of the casing contained in said first shirred supply to produce a plurality of stuffed products without exhausting the casing contained in said first shirred supply;
    (c) severing the last stuffed product from the remaining unstuffed portion of the first supply;
    (d) moving said remaining unstuffed portion of the first supply of shirred casing to a second stuffing position; and then (e) continuing at said second stuffing position, the repetitive stuffing, gathering and closing of casing from the first supply until it is substantially exhausted.

4. A method as in claim 3 comprising:
(f) moving a second supply of casing into the first stuffing position when the remaining unstuffed portion of the first supply is moved to said second stuffing position; and
(g) repeating a sequence of stuffing, gathering and closing casing from the second supply at said first position during the course of the repetitive stuffing, gathering and closing of the remaining unstuffed portion of the first shirred supply at said second position.

5. A method as in claim 4 wherein said gathering and closing of stuffed casing at one of said stuffing positions is concurrent with stuffing of casing at the other of said stuffing positions.

6. A method as in claim 4 wherein said first and second shirred supplies are positioned on separate stuffing horns and said moving steps (d) and (f) are accomplished by moving each of said horns in sequence to said first stuffing position and then to said second stuffing position.

7. A method as in claim 6 including providing a third supply of casing positioned on a third stuffing horn at a load position and performing said moving steps (d) and (f) by moving each of said horns in sequence from said load position to said first stuffing position, then to said second stuffing position and then back to said load position.

8. A method as in claim 7 utilizing a casing supply comprising a shirred casing article composed of a length of shirred casing disposed on a tubular core, including the further steps of:
(a) loading a said shirred casing article onto said third stuffing horn at said load position;
(b) indexing said third horn from said load position to said first stuffing position and stuffing a portion of the shirred casing from said casing article at said first stuffing position;
(c) indexing said third horn from said first stuffing position to said second stuffing position and then continuing stuffing at said second stuffing position to utilize substantially all of the remaining shirred casing from said casing article;
(d) indexing third horn back to said load position; and thereafter
(e) removing the tubular core from said third horn.

9. A method of producing encased food products comprising the steps of:
(a) utilizing at least three stuffing horns and positioning a first horn at a first stuffing position, a second horn at a second stuffing position and a third horn at a load position;
(b) disposing a supply of shirred casing on each horn wherein the supply on said second stuffing horn contains a shorter length of casing than the supply on either said first and third stuffing horns;
(c) cycling a continuous flow of food product under pressure back and forth between the stuffing horns at said first and second stuffing positions to alternate the drawing forward and stuffing of casing from the supply of shirred casing on said first and second stuffing horns;
(d) closing the stuffed casing drawn forward at one of said stuffing positions concurrent with the stuffing of casing at the other stuffing position so that the production of encased products alternates between said stuffing positions;
(e) continuing said cycling step (c) and closing step (d) until the supply of shirred casing on said second stuffing horn is about to expire, and then terminating said continuous flowing of food product to the stuffing horns at said stuffing positions;
(f) indexing said stuffing horns to place said first stuffing horn at second stuffing position, said second horn at load position and said third horn at said first stuffing position; and thereafter
(g) repeating steps (c) through (f).

10. A method as in claim 9 including removing from the second stuffing horn at said load position any remnant of the supply of shirred casing remaining thereon and then loading a new supply of shirred casing onto the second stuffing horn.

11. A method as in claim 9 including providing a casing article comprising a supply of shirred casing disposed on a tubular core; loading a said casing article onto a stuffing horn at said load position prior to indexing a said stuffing horn to said first stuffing position and subsequently removing the tubular core from a said stuffing horn after the indexing thereof from said second stuffing position to said load position.

12. A method as in claim 11 including disposing a stuffing horn at said load position in an upwardly tilted orientation and loading a said casing article onto a said stuffing horn at least in part by gravity.

13. A method as in claim 9 comprising:
(a) positioning on each horn an annular sizing means over which casing is drawn for circumferentially stretching and expanding the casing during stuffing, the location of said sizing means on said horns being such that a discharge end portion of each horn extends longitudinally from the sizing means thereon; and
(b) discharging food product in a single longitudinal stream from said discharge end portion and in a plurality of radial streams from about said discharge end portion such that food product discharging in said streams swirls and fills the volume of the expanded casing as defined by the length of said discharge end portion and the diameter of said annular sizing means.

14. A stuffing machine comprising:
(a) a valve having an inlet for pressurized food product, a pair of outlets and a gate for communicating said inlet to one or the other of said outlets;
(b) a pump for continuously flowing a food product under pressure to said inlet;
(c) a movable support;
(d) a trio of stuffing horns carried by said support and arranged thereon such that any single horn defines a load position and the remaining pair of horns communicate with said outlets and define a first and a second stuffing position, each of said horns adapted to receive a supply of casing for stuffing;
(e) motor means for indexing said support to move each of said stuffing horns in a stepwise sequence initially from said load position, then to said first stuffing position, then to said second stuffing position, and then to said load position;
(f) drive means connected to said valve gate for cycling the continuous flow of food product first through one of said outlets and then the other thereby to alternately draw forward and stuff casing from the supply of casing on horns in said first and second stuffing positions;

(g) closure means associated with each of said first and second stuffing positions for gathering and closing stuffed casing; and (h) control means coordinating the operation of said drive means and closure means such that closure means associated with one of said stuffing positions is operated to close stuffed casing concurrent with the stuffing of casing at the other of said stuffing positions.

15. A stuffing apparatus as in claim 14 including an end-of-casing sensor at said second stuffing position and said control means being operable responsive to said end-of-casing sensor to stop said pump and operate said motor means to index said support and each of said horns one step in said stepwise sequence.

16. A stuffing machine as in claim 14 wherein each horn at said load position is tilted upwardly with respect to the horizontal for receiving a said casing supply.

17. A stuffing machine as in claim 16 including loader means having a chute for feeding a said shirred casing onto a stuffing horn at said load position.

18. A stuffing machine as in claim 17 wherein each horn at said load position is adapted to receive a said casing supply in the form of a shirred stick disposed on a tubular core and said core having at its fore end a sizing disc for circumferentially stretching casing drawn forward from said stick and over said sizing disc during stuffing.

19. A stuffing machine comprising:

(a) a movable first stuffing horn adapted to receive a first shirred casing;

(b) valve means having an inlet for food product under pressure, two outlets, and a gate for selectively communicating said inlet to one or the other of said outlets;

(c) motor means for moving said first stuffing horn initially to a first stuffing position in communication with one of said outlets and then to a second stuffing position in communication with the other of said outlets; and (d) control means operatively connected to said motor means for initiating the movement of said stuffing horn to said second stuffing position when a portion of a said shirred casing has been stuffed at said first stuffing position.

20. A stuffing machine as in claim 19 comprising:

(a) a second movable horn adapted to receive a second shirred casing and being movable into the position vacated by said first stuffing horn;

(b) a pump for delivering a continuous flow of food product under pressure to said inlet;

(c) closure means associated with each valve outlet for gathering and closing casing stuffed at said first and second stuffing positions;

(d) drive means for cycling said valve gate back and forth to direct said continuous flow first to one and then the other of said outlets; and (e) control means coordinating the operation of said closure means and drive means such that closing of stuffed casing at said first horn is concurrent with the stuffing of casing at said second horn.

* * * * *